US010277816B2

(12) United States Patent
Kadambala et al.

(10) Patent No.: US 10,277,816 B2
(45) Date of Patent: Apr. 30, 2019

(54) SYSTEMS AND METHODS TO REDUCE ACTUATOR POWER LEAKAGE

(71) Applicant: QUALCOMM Incorporated, San Diego, CA (US)

(72) Inventors: Ravi Shankar Kadambala, Hyderabad (IN); Ajay Kumar Dhiman, Hyderabad (IN); Gaurav Gagrani, Hyderabad (IN); Ravi Kishore Tanuku, Hyderabad (IN); Jeyaprakash Soundrapandian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 10 days.

(21) Appl. No.: 15/596,330

(22) Filed: May 16, 2017

(65) Prior Publication Data

US 2018/0091737 A1 Mar. 29, 2018

Related U.S. Application Data

(60) Provisional application No. 62/401,101, filed on Sep. 28, 2016.

(51) Int. Cl.
*H04N 5/232* (2006.01)
*G02B 7/09* (2006.01)
(Continued)

(52) U.S. Cl.
CPC ....... *H04N 5/23241* (2013.01); *G01C 21/206* (2013.01); *G01S 5/0263* (2013.01);
(Continued)

(58) Field of Classification Search
CPC ........... H04N 5/23241; H04N 5/23212; H04N 5/23293; G02B 7/09
See application file for complete search history.

(56) References Cited

U.S. PATENT DOCUMENTS 7,801,274 B1 * 9/2010 Isaksen ................. A61B 6/145
378/38
2002/0089722 A1 7/2002 Perkins et al.
(Continued)

FOREIGN PATENT DOCUMENTS

EP 3048747 A1 7/2016
JP 2007170831 A 7/2007
JP 2013054221 A 3/2013

OTHER PUBLICATIONS

International Search Report and Written Opinion—PCT/US2017/045884—ISA/EPO—dated Oct. 10, 2017.

*Primary Examiner* — Abdelaaziz Tissire
(74) *Attorney, Agent, or Firm* — Paradice and Li LLP

(57) ABSTRACT

One innovation includes an imaging device having an image sensor, a lens having a movable optical element, and an actuator operative to move the one optical element to a plurality of lens positions. The imaging device further includes an electronic display, a power source electrically coupled to the camera system and to the display, the power source (e.g., voltage regulator) configured to provide power to the display and the camera system, a memory circuit configured to store information representing an actuator control value that corresponds to a low-power focus position, and an electronic hardware processor coupled to the memory circuit, the actuator and the electronic display. The processor may retrieve the actuator control value from the memory circuit and controls the actuator to move the optical element to the lens position that corresponds to the low-power focus position when the camera system is in a deactivated state.

30 Claims, 5 Drawing Sheets

(51) Int. Cl.
*H04W 4/80* (2018.01)
*G01S 5/16* (2006.01)
*H04B 10/116* (2013.01)
*H04W 64/00* (2009.01)
*H04W 72/00* (2009.01)
*G01C 21/20* (2006.01)
*G03B 3/10* (2006.01)
*G06F 1/3287* (2019.01)
*H04B 10/60* (2013.01)
*H04W 52/02* (2009.01)
*G01S 5/02* (2010.01)
*H04W 4/04* (2009.01)
*H04W 48/10* (2009.01)
*G01S 1/70* (2006.01)
*G02B 7/10* (2006.01)
*G03B 13/34* (2006.01)

(52) U.S. Cl.
CPC ............... *G01S 5/16* (2013.01); *G01S 5/163* (2013.01); *G02B 7/09* (2013.01); *G03B 3/10* (2013.01); *G06F 1/3287* (2013.01); *H04B 10/116* (2013.01); *H04B 10/60* (2013.01); *H04N 5/23212* (2013.01); *H04N 5/23245* (2013.01); *H04N 5/23293* (2013.01); *H04W 4/80* (2018.02); *H04W 52/0254* (2013.01); *H04W 64/003* (2013.01); *H04W 72/005* (2013.01); *G01S 1/70* (2013.01); *G02B 7/10* (2013.01); *G03B 13/34* (2013.01); *G03B 2217/007* (2013.01); *H04W 4/043* (2013.01); *H04W 48/10* (2013.01); *H04W 52/029* (2013.01); *Y02D 70/00* (2018.01); *Y02D 70/1262* (2018.01); *Y02D 70/142* (2018.01); *Y02D 70/144* (2018.01); *Y02D 70/164* (2018.01); *Y02D 70/22* (2018.01); *Y02D 70/46* (2018.01)

(56) References Cited

U.S. PATENT DOCUMENTS

| | | | |
|---|---|---|---|
| 2004/0125229 A1 | 7/2004 | Aoyama et al. | |
| 2009/0002526 A1* | 1/2009 | Koishi | H04N 5/23209 348/241 |
| 2009/0284643 A1* | 11/2009 | Shibuno | G03B 13/00 348/347 |
| 2011/0058093 A1 | 3/2011 | Kim | |
| 2011/0157460 A1 | 6/2011 | Kim et al. | |
| 2011/0199533 A1 | 8/2011 | Drader et al. | |
| 2011/0273546 A1 | 11/2011 | Lin et al. | |
| 2012/0327293 A1* | 12/2012 | Ollila | G02B 7/36 348/362 |
| 2013/0028583 A1* | 1/2013 | Kamimura | G03B 3/10 396/133 |
| 2013/0028584 A1* | 1/2013 | Kamimura | G02B 7/08 396/135 |
| 2013/0141555 A1 | 6/2013 | Ganick et al. | |
| 2013/0165111 A1 | 6/2013 | Willins | |
| 2013/0278812 A1 | 10/2013 | Ku | |
| 2014/0139728 A1 | 5/2014 | Kim | |
| 2014/0270796 A1 | 9/2014 | Jovicic et al. | |
| 2015/0222799 A1 | 8/2015 | Noorkami et al. | |
| 2015/0316743 A1 | 11/2015 | Lewkow | |
| 2016/0047890 A1 | 2/2016 | Ryan et al. | |
| 2017/0034432 A1 | 2/2017 | Lou et al. | |
| 2017/0187454 A1 | 6/2017 | Zhang et al. | |
| 2017/0289429 A1* | 10/2017 | Chan | H04N 5/23241 |
| 2018/0088208 A1* | 3/2018 | Gagrani | G02B 7/09 |

* cited by examiner

| TYPE OF CAMERA COMPONENTS | ACTUATOR CONTROL VALUE FOR LENS POSITION WITH MINIMAL POWER USAGE |
|---|---|
| COMPONENT SET 1 | LENS POSITION A |
| COMPONENT SET 2 | LENS POSITION B |
| COMPONENT SET 3 | LENS POSITION C |
| • | • |
| • | • |
| • | • |
| COMPONENT SET N | LENS POSITION N |

FIG. 3

SYSTEMS AND METHODS TO REDUCE ACTUATOR POWER LEAKAGE

CROSS-REFERENCE TO RELATED APPLICATIONS

This application claims the benefit of U.S. Provisional Patent Application No. 62/401,101, filed on Sep. 28, 2016, entitled "SYSTEMS AND METHODS TO MINIMIZE ACTUATOR POWER LEAKAGE," the contents of which is hereby incorporated by reference herein in its entirety and for all purposes.

TECHNICAL FIELD

The systems and methods disclosed herein are directed to reducing power in imaging systems, and particularly, to a device having a power source coupled to a camera and a display in an arrangement that operates to minimize power usage.

BACKGROUND

Minimizing power consumption in mobile devices is still important due to the nearly constant use of certain functionality of the mobile device even when in a battery-use mode. In many implementations, the camera of a mobile device, e.g., a cellphone, may have an actuator which moves one or more optical elements of a lens assembly to various positions that correspond to focusing the lens on a target scene. When the camera is not being used, the actuator can be configured to move the lens to a default position, for example, the infinity position.

A power source, for example a low voltage regulator (LDO), may be coupled to a display and a camera system (which may also be referred to herein as simply a "camera"), such that the power source provides power to both the display and the camera system. In some examples, the camera system includes a lens having at least one optical element, and an actuator which is coupled to the lens. The power source provides power to both the display and the camera system, such that the camera system will always be receiving power unless the power source is turned off. For example, when the display and the camera are both turned off (or are deactivated). Because the same power source always provides power to both the camera system (e.g., the actuator) and the display, when the display is on some power is still provided to, and consumed by, camera system even when the camera system appears to be turned off (or is not currently being operated to capture images). In such configuration, the actuator cannot be made to use no power because it is still receiving power. For example, even when a camera application on a cell phone is discarded and the camera application is no longer running, the camera will still be receiving power from the voltage regulator. For some components of the cell phone, including the actuator, the only way to control whether they receive and consume power is by activating or de-activating the voltage regulator supplying power to the component, that is, the actuator does not have another way to power down except to power down the voltage regulator. As a result, the actuator does not turn off but instead continues to consume power at least at a low level even when camera software (application) turns the camera off. This results in power consumption by the camera continuously even when the camera is off. The power consumption becomes negligible or zero only if the voltage regulator is powered down. Accordingly, improvements in such cell phones for minimizing the power usage of the camera would be advantageous.

SUMMARY

Certain aspects of this invention relate to systems and techniques for minimizing power usage in camera's that have a voltage regulator that is shared between at least one camera component and a display. One innovation includes an imaging device, including a camera system having an image sensor having sensing elements arranged in an imaging plane, a lens having at least one movable optical element, the lens and image sensor arranged in an optical path for propagating light from a target scene through the lens and to the image sensor, an actuator coupled to the lens, the actuator operative to move the at least one optical element to a plurality of lens positions each being a different distance from the image sensor and corresponding to a different focus of the lens. The imaging device further includes an electronic display, a power source electrically coupled to the camera system and to the display, the power source (e.g., voltage regulator) configured to provide power to the display and the camera system, a memory circuit configured to store information representing an actuator control value that corresponds to a low-power focus position, the low-power focus position being the lens position where the actuator uses the least amount of power, and an electronic hardware processor coupled to the memory circuit, the actuator and the electronic display, wherein the processor is configured to retrieve the actuator control value from the memory circuit and control the actuator to move the at least one optical element to the lens position that corresponds to the low-power focus position when the camera system is placed is a deactivated state.

Embodiments of the imaging device may include or be configured with one or more of the following aspects, or other aspects. The power source referred to herein may be a voltage regulator). In one aspect, in the deactivated state, the power source supplies power to the camera system and the camera system is not operating to focus on the target scene. In another aspect, in the deactivated state, the voltage regulator supplies power to the camera system and to the display, and the camera system is not operating to focus on the target scene. In another aspect, in the deactivated state, the voltage regulator supplies power to the actuator and to the display and the image sensor is not generating image data. In another aspect, the voltage regulator is a low-dropout voltage regulator. In another aspect, the actuator control value comprises a predetermined value. In another aspect, the actuator control value corresponds to type of the camera system included in the imaging device. In another aspect, the actuator control value that corresponds to a low-power focus position is selected based on type of the actuator. In another aspect, the imaging device further includes actuator control values for a plurality of cameras stored in the memory circuit. In another aspect, the lens is positioned on one side of the image sensor, where an optical axis of the lens is aligned perpendicular with the image sensor, and where the actuator operates to move the at least one optical element in a direction substantially perpendicular to the imaging plane to the low-power focus position.

Another innovation includes a method of operating a mobile imaging device, the method including supplying power from a power source to an electronic display of the imaging device, supplying power from the power source to a camera system of the imaging device, where the camera system includes an image sensor having sensing elements arranged in an imaging plane, a lens having at least one optical element, the lens and image sensor arranged in an optical path for propagating light from a target scene through the lens and to the image sensor, and an actuator coupled to the lens, the actuator operative to move the at least one optical element to a plurality of lens positions each being a different distance from the image sensor for focusing the lens. The method further includes receiving, with a control signal indicating to place the camera system in an deactivated state, retrieving, with an electronic hardware processor from a memory circuit, an actuator control value that corresponds to a low-power focus position, the low-power focus position being the lens position where the actuator uses the least amount of power while receiving power from the power source, and controlling the actuator, with the electronic hardware processor, to move the lens to the low-power focus position, wherein the power source continues to supply power to the display and to the camera system when the camera system is in a deactivated state.

Embodiments of the method may include one or more of the following aspects, or other aspects. In one aspect, the method further includes providing a control signal, from the electronic hardware processor to the camera system, to place the camera system in the deactivated state. In another aspect, wherein in the deactivated state, the power source supplies power to the actuator and to the display, and the image sensor does not generate image data. In another aspect, the power source is a voltage regulator, for example, a low-dropout voltage regulator. In another aspect the method further comprises storing wherein the actuator control value in the memory circuit. In another aspect the actuator control values include a predetermined value.

In another aspect, the actuator control value is based on the type of camera system. In another aspect, the actuator control value is based on the type of actuator in the camera system. In another aspect, actuator control information is stored in the memory circuit and used by the processor to control the actuator to move the lens to the low-power focus position.

Another innovation includes a non-transitory computer readable medium comprising instructions that when executed cause an electronic hardware processor to perform a method for operating a mobile imaging device, the method including supplying power from a voltage regulator to an electronic display of an imaging device and supplying power from a power source to a camera system of the imaging device. The camera system may include an image sensor having sensing elements arranged in an imaging plane, a lens having at least one optical element, the lens and image sensor arranged in an optical path configured to propagate light through the lens and to the image sensor, and an actuator coupled to the lens, the actuator operative to move the at least one optical element to a plurality of lens positions each being a different distance from the image sensor. The method further includes receiving, with a control signal indicating to place the camera system in an deactivated state, retrieving, with an electronic hardware processor from a memory circuit, an actuator control value that corresponds to a low-power focus position, the low-power focus position being the lens position where the actuator uses the least amount of power while receiving power from the power source; and controlling the actuator, with the electronic hardware processor, to move the at least one optical element of the lens to the to the lens positions that corresponds to the low-power focus position, wherein the power source continues to supply power to the display and to the camera system when the camera system is in a deactivated state.

Embodiments of the non-transitory computer readable medium may include one or more of the following aspects, or other aspects. In one aspect, method further includes providing a control signal, from the electronic hardware processor to the camera system, to place the camera system in the deactivated state. In another aspect of the non-transitory computer readable medium, in the deactivated state, the power source supplies power to the actuator and to the display, and the image sensor does not generate image data. In another aspect, the actuator control value comprises a predetermined value. In another aspect, the actuator control value is based on the type of camera system. In another aspect, the actuator control value is based on the type of actuator.

Another innovation includes an imaging device that includes a camera system having an image sensor, a lens assembly comprising at least one optical element that is movable for focusing the lens, an actuator coupled to the lens assembly, the actuator operative to move the at least one optical element to a plurality of lens positions for focusing light on the image sensor, a display, a means for regulating voltage electrically coupled to the camera system and to the display, the means for regulating power configured to provide power to the display and the camera system when the means for regulating voltage is providing to either of the display or the camera system, a memory circuit configured to store an actuator control value that corresponds to a low-power focus position, the low-power focus position corresponding to a lens position where the actuator uses the least amount of power to maintain the at least one optical element at the lens position, and responsive to putting the camera system in a deactivated state, means for retrieving the actuator control value from the memory circuit and controlling the actuator to move the at least one optical element to the lens position that corresponds to the low-power focus. In one aspect, the means for retrieving comprises an electronic hardware processor coupled to the memory circuit, the actuator and the electronic display, the electronic hardware processor configured, responsive to deactivating the camera system, to retrieve the actuator control value from the memory circuit and control the actuator to move the at least one optical element to the lens position that corresponds to the low-power focus position that corresponds to the low-power focus position. In another aspect, the means for regulating power comprises a low dropout voltage regulator, and wherein when the camera system is placed in a deactivated state, the camera system is not operating to focus on a target scene. In another aspect, in the deactivated state, the voltage regulator means for regulating power supplies power to the actuator and to the display and the image sensor is not generating image data. In another aspect, voltage regulator is a low-dropout voltage regulator. In another aspect, the actuator control value corresponds to type of the camera system of the imaging device.

Embodiments of the non-transitory computer readable medium may include one or more of the following aspects, or other aspects. In one aspect of the imaging device, in the deactivated state, the camera system is not operating to focus on a target scene. In another aspect, in the deactivated state, the voltage regulator supplies power to the actuator and to the display and the image sensor is not generating image data. In another aspect, the voltage regulator is a low-dropout voltage regulator. In another aspect, the actuator control value corresponds to type of the camera system of the imaging device.

BRIEF DESCRIPTION OF THE DRAWINGS

The disclosed aspects will hereinafter be described in conjunction with the appended drawings and appendices, provided to illustrate and not to limit the disclosed aspects, wherein like designations denote like elements.

FIG. 3 is a table that illustrates an example of information that may be stored in memory, and that be retrieved and used by an actuator to move a lens to a position that uses a minimum amount of power, for example, when power is being supplied to the actuator of a camera system but the camera system is not being used for imaging.

DETAILED DESCRIPTION

Figure 1:
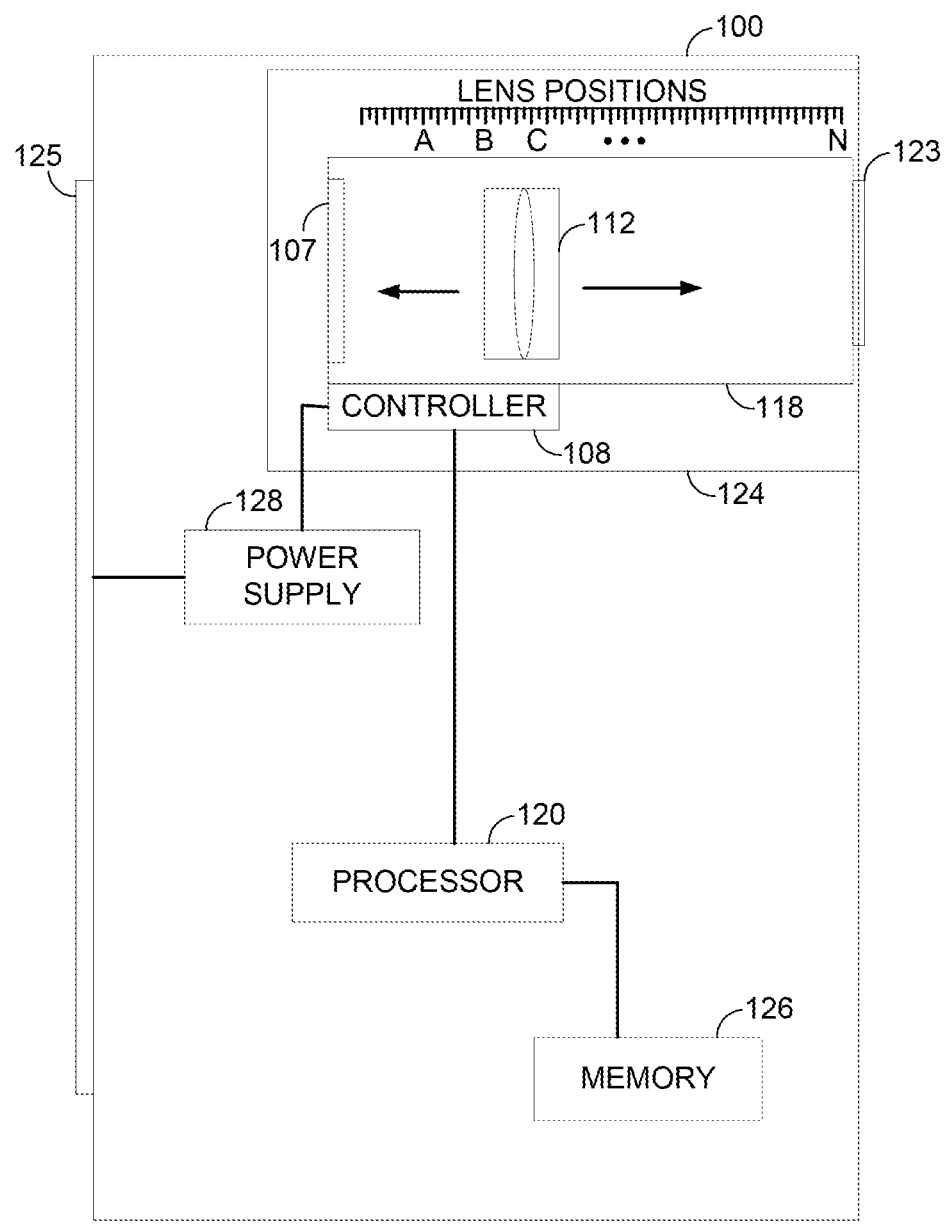
FIG. 1 is a schematic that illustrates certain aspects of embodiments of the invention.

Embodiments described herein relate to systems and techniques for minimizing power usage in a camera that has a voltage regulator that is shared between at least one camera component and a display. The systems and methods can be implemented on a cell phone that includes a camera, any mobile device that includes a camera, or on a camera that is not part of a cell phone. The camera may include an actuator (or "actuator module) that moves one or more optical elements of a lens assembly to various positions for focusing the camera. For ease of description, a single optical element, or a plurality of optical elements arranged in a lens assembly may be collectively referred to herein as a "lens." The actuator is configured to move the lens to focus light received from a target scene on an image sensor. For example, the actuator may move the lens to a "macro" setting (or position) for a target scene that is close to the camera, or to an "infinity" setting (or position) for a target scene that is at a relatively large distance from the camera. In many lens arrangements, the "infinity position" is a lens position where the lens is moved to be nearest to the image sensor, and the "macro position" is the lens position where the lens is moved to be farthest from the image sensor. The actuator is configured with components that move the lens. In some embodiments, the actuator includes a voice coil motor (VCM). A biasing means (for example, a spring) may be coupled to the lens to bias the lens towards a certain position. In many implementations, when the camera is powered down, a 3A algorithm (for performing auto-focus, auto-exposure, auto-white point) moves the lens to a default position, for example, the infinity position, using the actuator to physically move the lens. In most of low-end and mid-tier phones, multimedia subsystems will share voltage regulators due to space restrictions of the system-on-chip (SOC) and to lower cost of the power management integrated circuit (PMIC).

In many imaging systems, for example cell phones, a low-dropout voltage regulator (LDO) is shared between a display and a camera, and power is consumed by the camera sensor/components even after the camera is turned off if the display is still "on." Some components of the phone, like the actuator, has a power on/off control only with a voltage regulator. That is, the actuator does not have another way to power down except to power down the LDO. As a result, in many imaging systems, the actuator does not turn off, and continues to consume power (at least at a low level) even when camera software turns the camera off—the LDO cannot be powered down because it is shared and needed by the display. This results in power consumption by the camera continuously even when the camera is off. The power consumption becomes negligible only if the camera and the display are placed in an "off" of "suspend" state, and the voltage regulator can be powered down.

The actuator movement is controlled via a digital-to-analog converter (DAC) register using an intelligent interface controller (I2C). All infinity/macro DAC value are not the same across all sensors due to module manufacturing errors. The infinity and macro DAC values may be stored in eeprom calibration data for each sensor. The lens position corresponding to "infinity is the generally the position where the sensor consumes less power than the macro. Because sensors may have different "infinity" settings due to module manufacturing errors, different power is consumed by different sensors when the lens is positioned at the infinity lens position.

To minimize power consumption, the system can be configured to place the actuator in a lowest power mode when the LDO is shared with others and the camera is turned "off" even though the display is still on. That is, the when the LDO shared by the actuator and display is still activated. Generally, the lowest power mode position will be a lens position that is closer to infinity than it is to a macro lens position.

The process of putting the actuator to the low-power mode can be determined with the module integrator, which finds the lens position where the actuator uses the least amount of power. This lowest power lens position may be saved in the eeprom, and may correspond to the position of the lens associated with a focus at infinity. In operation, when the camera is turned "off" but the LDO is still activated (because it is shared by the display), the actuator places the lens in a position that is predetermined to be the lowest power consumption place for the lens. Information of this lowest poser consumption position is stored in memory and may be based on the specific configuration of the sensor/actuator.

In some embodiments, when this process has been implemented, a significant power consumption improvement of 2-4 percent may be realized (that is, 2-4 percent less power is needed to perform the same operations).

FIG. 1 is a schematic that illustrates an example of certain aspects of some embodiments, in particular the components of a sensor module (or camera system) 124 incorporated in an imaging device 100. The sensor module 124 includes an image sensor 107, a lens 112, and an auto-focus (AF) component or actuator 118 configured to move the lens in a direction perpendicular to the image sensor 107 to one of a plurality of lens positions in a range of lens positions, that are represented by lens positions A, B, C, and N. For example, in the illustrated embodiment the actuator 118 is operable to move the lens 112 towards the scene (away from the image sensor 107) and away from the scene (towards the image sensor 107). Moving the lens to one of the lens positions requires the actuator to use power to keep the lens at that position. In other words, as long as power is being supplied to the actuator 118 and the lens is in any of the plurality of lens positions, then power is being consumed by the actuator 118. The camera system 124 also includes an aperture 123 through which light can enter the camera system 124 and propagate through the lens 112 to the image sensor 107. The embodiment of a camera system 124 illustrated in FIG. 1 also includes a controller 108 coupled to the actuator 118, that can receive signals and control the actuator 118 to move the lens 112 to a lens position.

Figure 2:
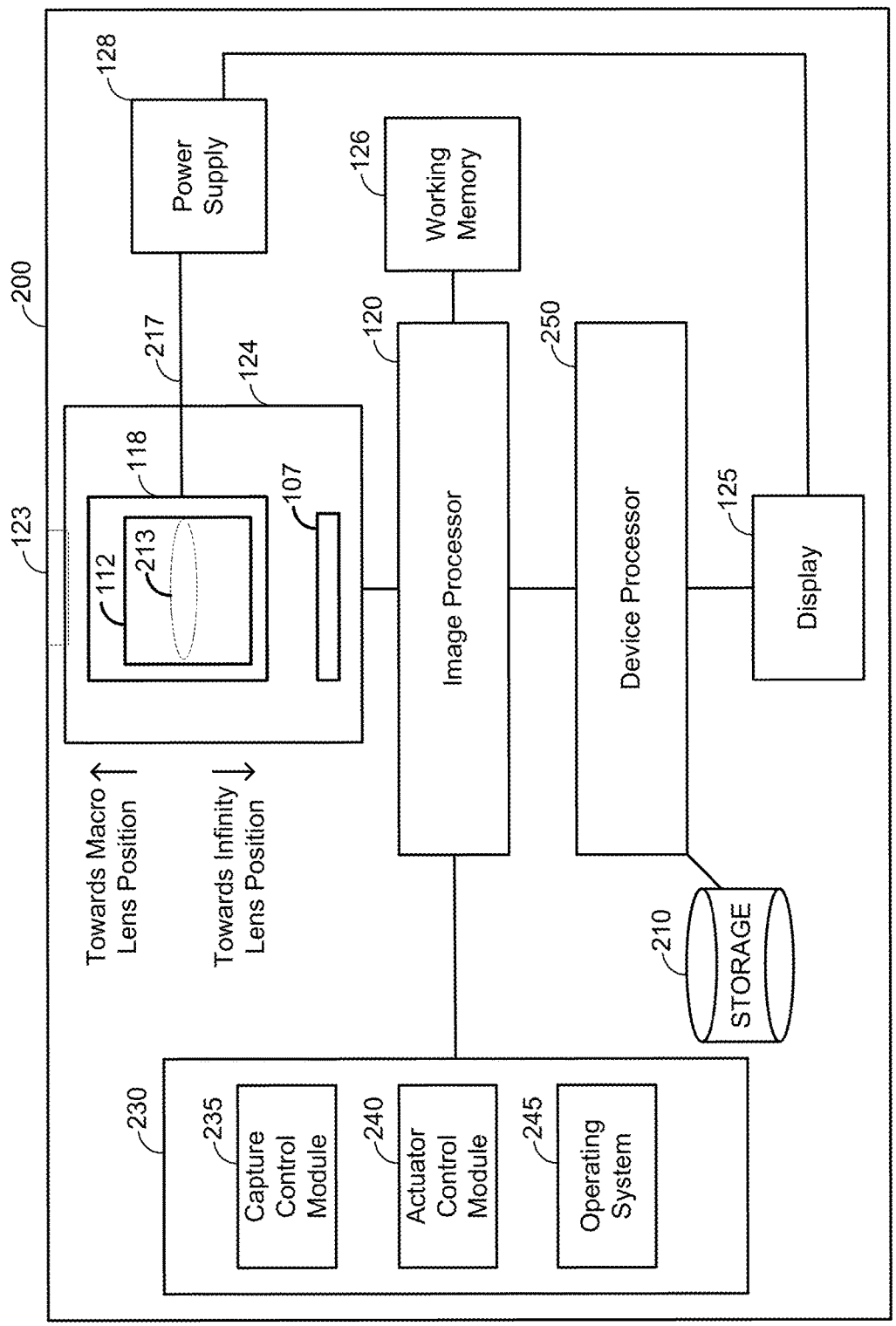
FIG. 2 is a block diagram illustrating an embodiment of a device that includes a camera system, according to some embodiments

In the illustrated embodiment, the imaging device 100 also includes a, electronic hardware processor 120, which may be referred to simply as a "processor" and which sometimes may be referred to as an "image processor" when the electronic hardware processor is configured to perform image data operations (for example, as illustrated in FIG. 2), and working memory ("memory") 126. As discussed further in reference to FIG. 2, the processor 120 may be an image processor or can be configured to be a plurality of processors. Working memory 126 can be working memory of the processor 120, or a solid state memory such as a FLASH memory, RAM, ROM, and/or EEPROM. The memory 126 is configured to store information used by the processor 120 to operate and control the imaging device 120. Such information may include information that is used by the processor 120 to control the actuator to move the lens to a low-power focus position when the camera is deactivated (for example, placed in an "off" state), or in a standby mode, to save power. For example, for some embodiments where the imaging device is implemented on a cell phone, deactivating the camera, or placing the camera in a stand-by mode, may be accomplished by, for example, stopping the camera application, or enabling a different application that does not use the camera.

The imaging device 100 also includes power supply 128 and a display 125. The power supply 128 is coupled to the camera system 124 and supplies power to the actuator 118. The power supply 128 is also coupled to the display 125 and provides power to the display 125. The display may be any type of an electronic display having, for example, a plurality of LCD, LED, or OLED display elements (pixels). The power supply may be any type of a power supply component that supplies power to both the display 125 and the camera system 124, and controlled such that if one of either the display 125 or the camera system 124 is activated (needs power), power is also available and is supplied to the other of the display 125 and the camera system 124. In some embodiments the power supply is a voltage regulator, for example a low dropout voltage regulator (LDO).

FIG. 2 is a block diagram illustrating an example of an embodiment of an imaging device 200. In particular, FIG. 2 illustrates an example imaging device 200 that can be, for example, a cell phone, a camera, or another type of mobile image capture device. The imaging device 200 is shown with certain components which may be included in embodiments of the imaging device 200. The illustrated imaging device 200 includes an image processor 120 coupled to a camera system 124. The image processor 120 is also coupled to, and in communication with, a working memory 126, memory 230, and device processor 250, which in turn is in communication with component for storage 210 and an electronic display 125. In the example embodiment illustrated in FIG. 2, the image processor 120 may be configured to perform image manipulation operations (for example, white balance and/or exposure operations). The device processor 250 may be configured to perform other operations, for example, to provide data to the display 125 and to store and retrieve information from storage 210.

The camera system 124 includes an image sensor 107, an actuator 118, and a lens 112. The image sensor 107 includes a plurality sensing elements arranged in an imaging plane. The lens 112 includes at least one optical element 213 through which light propagates in a path through the lens to the image sensor 107. Light propagates to the lens 112 from a scene through aperture 123, which allows light to pass through the housing of the imaging device 200 and enter the camera system 124. Light passing through the aperture 123 is refracted by the lens 112 as it propagates through the lens 112 to the image sensor 107. In some embodiments, the actuator 118 is a voice coil motor (VCM). Other embodiments can include other types of actuators. The actuator 118 is coupled to the lens 112 and is configured to move the lens 112 to a plurality of lens positions each at a different distance from the image sensor 107. For example, the image processor 120 can control the actuator 118 to move the lens 112 to a desired position for focusing or for an optical zoom operation, or to place the lens 112 in a determined position when the camera system 124 is deactivated such that the least amount (or a minimal amount) of power is consumed by the actuator 118. The imaging device 200 also includes a power supply 128. The power supply 128 is coupled to, and supplies power to, both the display 125 and the camera system 124, including the actuator 118. In some embodiments, the power supply 128 supplies power to other components of imaging device 200 as well. Because the power supply 128 supplies power to both the display 125 and the camera system 123, powering down (turning "off") the power supply 128 will affect the power received by both the camera system 123 (and actuator 118) and the display 125. In some embodiments the power supply 128 is a voltage regulator. For example, the power supply 128 can be a low dropout voltage regulator (an LDO regulator).

The imaging device 200 may be a cell phone, digital camera, tablet computer, personal digital assistant, or the like. Some embodiments of imaging device 200 can be incorporated into a vehicle-based imaging system, for example an unmanned aerial vehicle. There are many portable computing devices in which a reduced thickness stereoscopic imaging system such as is described herein would provide advantages. The imaging device 200 may also be a stationary computing device, a mobile device, or any device in which a stereoscopic imaging system would be advantageous. A plurality of applications may be available on the imaging device 200. These applications may include traditional photographic and video applications, panoramic image generation, stereoscopic imaging such as three-dimensional images and/or three-dimensional video, three-dimensional modeling, and three-dimensional object and/or landscape mapping, to name a few.

The image processor 120 may be configured to perform various processing operations on received image data. Examples of image processing operations include cropping, scaling (e.g., to a different resolution), image format conversion, image filtering (e.g., spatial image filtering), lens artifact or defect correction, stereoscopic matching, depth map generation, etc. In some embodiments, the image processor 120 can be a chip in a three-dimensional wafer stack including the image sensor 107 of the camera system 123, for example a RICA processor. In such embodiments the working memory 126 and memory 230 can be incorporated as hardware or software of the image processor 120. In some embodiments, image processor 120 may be a general purpose processing unit or a processor specially designed for imaging applications. Image processor 120 may, in some embodiments, comprise a plurality of processors. Certain embodiments may have a processor dedicated to each image captured and transmitted to the image processor 120. In some embodiments, image processor 120 may be one or more dedicated image signal processors (ISPs).

As shown, the image processor 120 is connected to a memory 230 (any "memory" described herein is also referred to herein as a "memory circuit" indicating that the memory may be hardware or media that is configured to store information) and a working memory 126. In the illustrated embodiment, the memory 230 stores capture control module 235, actuator control module 240, and operating system 245. These modules include instructions that configure the image processor 120 to perform various image processing and device management tasks. Working memory 126 may be used by image processor 120 to store a working set of processor instructions contained in the modules of memory 230. Alternatively, working memory 126 may also be used by image processor 120 to store dynamic data created during the operation of imaging device 200. As discussed above, in some embodiments the working memory 126 and memory 230 can be incorporated as hardware or software of the image processor 120. In some embodiments, the functionality of the image processor 120 and the device processor 250 are combined to be performed by the same processor.

As mentioned above, the image processor 120 is configured by several modules stored in the memory 230. The capture control module 235 may include instructions that configure the image processor 120 to adjust the capture parameters (for example exposure time, focus position, and the like) of the image sensor 107 and optionally the camera system 123. Capture control module 235 may further include instructions that control the overall image capture functions of the imaging device 200. For example, capture control module 235 may include instructions that call subroutines to configure the image processor 120.

Actuator control module 240 may comprise instructions that configure the image processor 120 to control the actuator 207. For example, the actuator control module 240 may configure the image processor 120 (or another processor) to determine if the camera system 123 is "on" or "off" determine whether the display 125 is "on" or "off," and provide certain control actions for the actuator 118 depending on the activation state of the display 125 and the camera system 123. The actuator control module 240 may also configure the image processor 120 (or another processor) to retrieve information from memory 230 or working memory 126 and use the retrieved information to control the actuator 118. For example, information indicating a low-power focus position of the lens 212 may be stored in a memory 230 or 126 of the imaging device 200. The low-power focus position is a position of the lens 212 that when the actuator 118 moves the lens to that position, the actuator 118 consumes the lowest amount of power. This position is not necessarily at an "infinity" position of the lens. The particular low-power focus position can depend on the components of the camera system 123. For example, a particular low-power focus position may depend on the type of actuator being used in the camera system 123, and even the particular make and/or model of the actuator 118.

Figure 4:
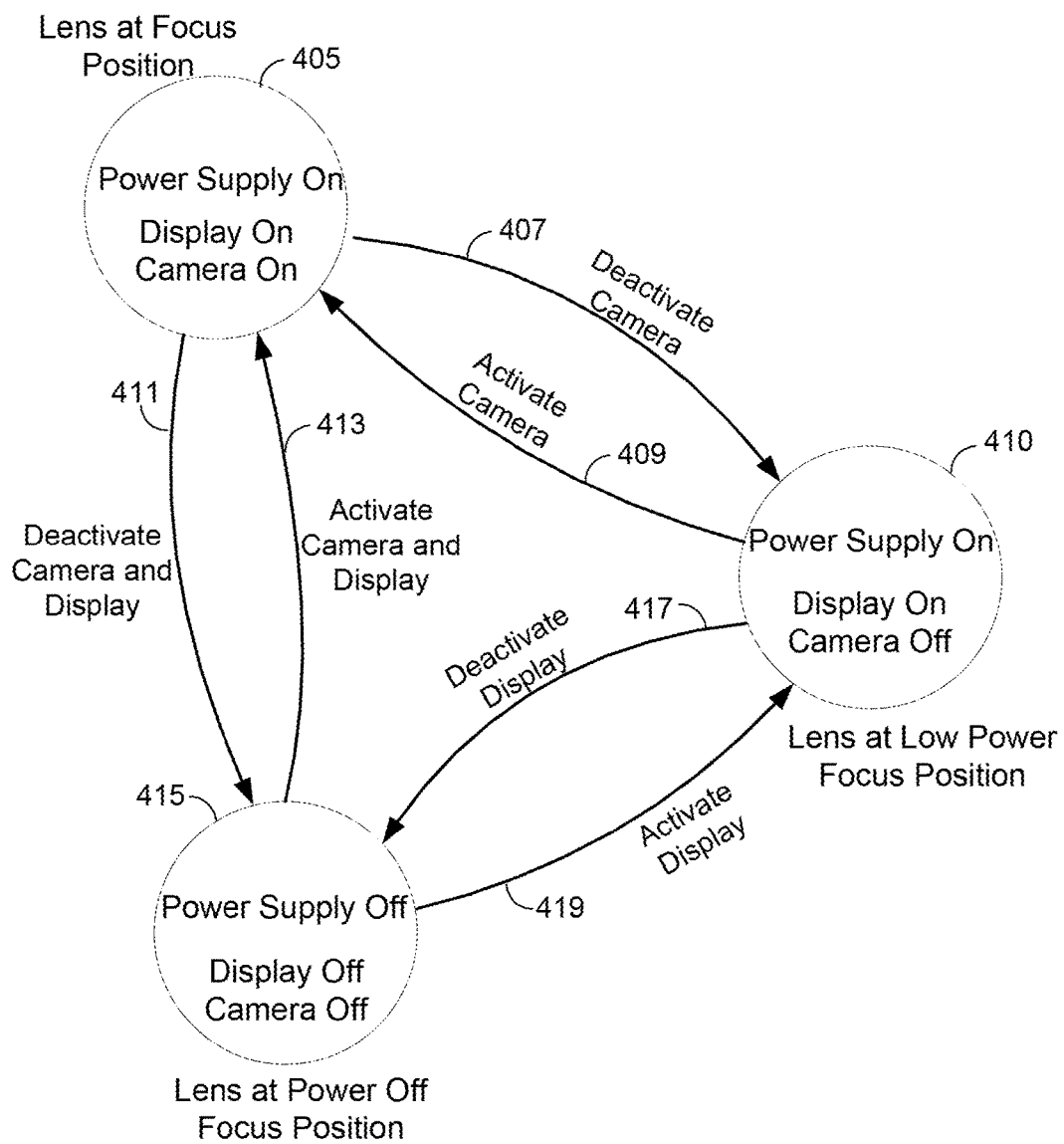
FIG. 4 is a state diagram illustrating three different states of a power supply, a display, and a camera system, and a corresponding lens position of a lens of the camera system.

If the image processor 120 determines that the display 125 is in an active state and the camera system 123 is in an inactive state (for example, an "off" state), the image processor 120 can operate to retrieve the low-power focus position information from memory 230 or 126, and control the actuator 118 to move the lens to the lens to a position that corresponds to the low-power lens position. An example of various "states" of the imaging device 200 is illustrated in FIG. 4. In some embodiments, the information of a low-power focus position corresponding to the actuator 118 is loaded in a memory component of the imaging device 200 when it is being manufactured and configured (for example, pre-sale) once the components incorporated into the imaging device 200 are known. For example, working memory 126, the actuator control module 240, or storage 210 can store information corresponding to, or representative of, one or more low-power focus positions. An example of such information is represented in the table illustrated in FIG. 3. In some embodiments, information corresponding to the low-power focus position (that is, indicative of the low-power focus position) can be downloaded to a memory of the imaging device 200 while the device is operational, for example, during a software update or upon initial configuration of the imaging device 200.

Operating system module 245 configures the image processor 120 to manage the working memory 126 and the processing resources of imaging device 200. For example, operating system module 245 may include device drivers to manage hardware resources such as the image sensor 107, the power supply 128, and storage 210. Therefore, in some embodiments, instructions contained in the image processing modules discussed above may not interact with these hardware resources directly, but instead interact through standard subroutines or APIs located in operating system component 245. Instructions within operating system 245 may then interact directly with these hardware components. Operating system module 245 may further configure the image processor 120 to share information with device processor 250.

Device processor 250 may be configured to control the display 125 to display captured images, or a preview of a captured image to a user. The display 125 may also be configured to provide a view finder displaying a preview image for use prior to capturing an image, or may be configured to display a captured image stored in memory or recently captured by the user. The display 125 comprise an LCD or LED screen and may implement touch sensitive technologies, for example providing a user interface for controlling device functions.

Device processor 250 or image processor 120 may write data to storage module 210, for example data representing captured images and/or depth information. While storage 210 is represented graphically as a traditional disk device, those with skill in the art would understand that the storage module 210 may be configured as any storage media device. For example, the storage module 210 may include a disk drive, such as a hard disk drive, optical disk drive or magneto-optical disk drive, or a solid state memory such as a FLASH memory, RAM, ROM, and/or EEPROM. The storage module 210 can also include multiple memory units, and any one of the memory units may be configured to be within the imaging device 200, or may be external to the image capture imaging device 200. For example, the storage module 210 may include a ROM memory containing system program instructions stored within the imaging device 200. The storage module 210 may also include memory cards or high speed memories configured to store captured images which may be removable from the imaging device 200.

Though not illustrated, imaging device 200 may include one or more ports or devices for establishing wired or wireless communications with a network or with another device.

Although FIG. 2 depicts an imaging device 200 having separate components including a processor, imaging sensor, and memory, one skilled in the art would recognize that these separate components may be combined in a variety of ways to achieve particular design objectives. For example, in some embodiments the memory components may be combined with processor components to save cost and improve performance. Additionally, although FIG. 2 illustrates two memory components, including memory component 230 comprising several modules and a separate working memory 126 comprising a working memory, one with skill in the art would recognize several embodiments utilizing different memory architectures. For example, a design may utilize ROM or static RAM memory for the storage of processor instructions implementing the modules contained in memory 230. The processor instructions may be loaded into RAM to facilitate execution by the image processor 120. For example, working memory 126 may comprise RAM memory, with instructions loaded into working memory 126 before execution by the image processor 120.

FIG. 3 is a table 300 that illustrates an example of information that may be stored in memory, and that be retrieved and used by an actuator to move a lens to a position that uses a minimum amount of power, for example, when power is being supplied to the actuator of a camera system but the camera system is not being used for imaging. In various embodiments, information that can be used by a processor to control an actuator to place the lens in a position of low (or lowest) power usage is stored in memory of the imaging device or the cameras system itself. For example, in some embodiments, the camera system 124 includes a controller 108 (FIG. 1) that includes memory that can be used to store information representative of a lens position for low-power usage. That is, at what distance from the image sensor 107 should the actuator 118 position the lens 112 such that the power usage by the actuator 118 (or the camera system 124) is low or at a minimum. In other embodiments, the low focus lens position information is stored in working memory 26 or in a specific module (e.g., actuator control module 240) of the imaging device 200 (FIG. 2).

The table 300 illustrates one example of how information of low-power focus positions may be ordered (or related) for an embodiment where a plurality of low-power lens positions are stored, each for a different set or type of camera, type of camera components, in an imaging device. In this example, Table 300 includes a first column 305 that includes information representing different components that may be incorporated into the camera system 124. Table 300 also includes a second column 310 that includes information representing a low-power lens position that corresponds to each of the component sets in the first column 305. For example, if the camera system has component set 3, the lens position for minimal power usage is LENS POSITION C. Accordingly, a processor can be configured to retrieve the stored information of a low-power lens position corresponding to whatever camera component set that is included on the imaging device 200 from such a table of stored information and use the retrieved information to place the lens in the position that uses that least amount of power when the camera is not being used but power is being supplied to the camera system 124 (for example, to the actuator 118). The table 300 illustrates an example of how information contained therein can be ordered, and an example of what type or information may be stored, according to some embodiments. In various embodiments, information may be stored in a lookup table, a list, or any type of relational arrangement such that a particular low-power focus position can be retrieved from memory and used to control an actuator to move a lens to a position that uses the least amount of power for that particular actuator.

FIG. 4 is a state diagram illustrating three different states of a power supply, a display, and a camera system of an imaging device, and also illustrates the corresponding lens position of a lens of the camera system. The components referred to in reference to FIG. 4 can be, for example, the components illustrated in FIG. 2. In a first state 405, a display is activated, a camera system is activated and a power supply is providing power to both the display and to the camera system. In the first state 405, the lens is positioned by the actuator at a lens position needed to support an imaging operation, for example, a focusing operation or performing an optical zoom operation. In a second state 410 a display is activated, a camera system is off, and a power supply is providing power to both the display and to the camera system. In the second state 410, the lens is positioned by the actuator at a low-power focus position. For example, at a position that takes the least amount if power to maintain such a position. In a third state 415, a display is off, a camera system is off, and a power supply is not providing power to either the display and to the camera system. In the third state 415, the lens is positioned at whatever position corresponds to the camera off position when no power is being supplied to the camera system.

FIG. 4 also illustrates operations where the imaging device changes state. For example, when the imaging device deactivates the camera and deactivates the display 411 from activated states, the imaging device changes states from the first state 405 to the third state 415 and the lens may be moved to a power off position. When the imaging device activates the camera and the display 411 when both are in a deactivated state, the imaging device changes states from the third state 415 to the first state 405 where the lens is operationally controlled for focusing or optical zoom operations.

FIG. 4 further illustrates when the imaging device changes states between the first state 405 and the second state 410. For example, when the imaging device deactivates the camera 407 when the imaging device is in the first state 405, and the display remains activated, the imaging device changes state from the first state 405 to the second state 410 and the lens is moved to be in the low-power focus position. When the imaging device activates the camera 409 and the display remains activated, the imaging device changes states from the second state 410 to the first state 405, where the lens operationally controlled for focusing or optical zoom operations.

FIG. 4 also illustrates when the imaging device changes states between the second state 410 and the third state 415. For example, when the imaging device deactivates the display 417 and the camera is off when the imaging device is in the second state 410, the imaging device changes state from the second state 410 to the third state 415, where the lens may be moved to be in a power off focus position. When the imaging device is in the third state 415, and the imaging device activates the display 419 and the camera remains off, the imaging device changes states from the third state 415 to the second state 410, where the lens is moved to the low-power focus position.

Figure 5:
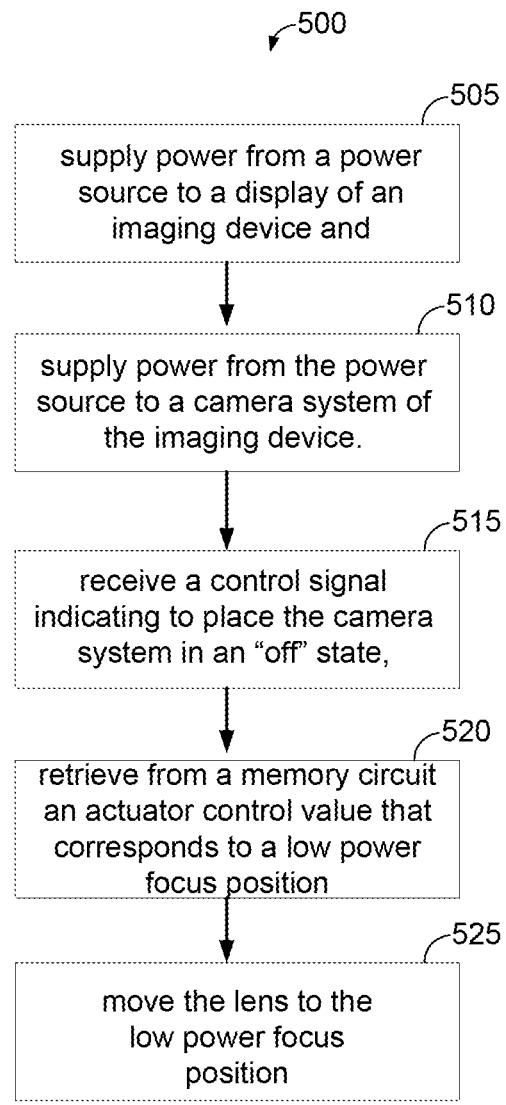
FIG. 5 is a flow chart illustrating an embodiment of a method operating a mobile imaging device camera system to minimize power loss when the camera system of the imaging device is turned "off" and the display of the imaging device is "on."

FIG. 5 is a flow chart illustrating an embodiment of a method 500 for operating a mobile imaging device camera system to minimize power loss when the camera system of the imaging device is turned "off" and the display of the imaging device is "on" and the actuator or the camera system and the display both receive power from the same voltage regulator. At block 505, the method 500 includes supplying power from a power supply (for example, a voltage regulator) to a display of an imaging device. In some embodiments, this may be performed by the power supply 128 (FIGS. 1 and 2) supplying power to the display 125. At block 505, the method includes supplying power from the power supply to a camera system of the imaging device. In some embodiments, this may be performed by the power supply 128 (FIGS. 1 and 2) supplying power to the camera system 124. As illustrated in FIG. 2, embodiments of such a camera system may include, for example, image sensor 107 having sensing elements arranged in an imaging plane, a lens 112 having at least one optical element 213, the lens 112 and image sensor 107 arranged in an optical path configured to propagate light from a target scene through the lens 112 and to the image sensor 107. The camera system may also include an actuator 118 coupled to the lens 112, the actuator 118 operative to move the lens 112 to a plurality of focus positions each being a different distance from the image sensor 107.

At block 515, the method 300 further includes receiving a control signal indicating to place the camera system in an "off" state. Even though the camera is in the "off" state, power is still being supplied to the actuator because the camera system and the display share the power supply and the power supply cannot be de-activated when the display is being used, even if the camera system is de-activated (or "off"). At block 520 the method 500 includes retrieving from a memory circuit an actuator control value, for example, information that corresponds to (or represents) a lens position that is a low-power focus position, where the low-power focus position is a lens position where the actuator uses the least amount of power. The low-power focus position can be dependent on the particular components used in the camera system (for example, the actuator). Accordingly, in some embodiments, information corresponding to a plurality of low-power lens positions, each for different types of components of the camera system, may be stored in memory, and retrieved when needed. An example of an embodiment of such ordered information is illustrated FIG. 3. Using the actuator control value, the actuator can move the lens to a certain position (the low-power focus position). At block 525, the method 500 further comprises controlling, with a processor, the actuator to move the lens to the low-power focus position, wherein the voltage regulator supplies power to the display and to the camera system when the camera system is in the "off" state.

Such methods can include other features, as described herein. For example, in some embodiments, when the in the "off" state, camera imaging functionality is disabled. In some embodiments, in the "off" state, the voltage regulator supplies power to the camera system and to the display, and camera imaging functionality is disabled. In some embodiments, in the "off" state, the voltage regulator supplies power to actuator and to the display, and the image sensor functionality is in an "off" state such that no image data is generated by the image sensor. In some embodiments, the voltage regulator is a low-dropout voltage regulator. In some embodiments, the low-power focus position includes a predetermined value. In some embodiments, the low-power focus position stored in the memory circuit is selected based on a type of camera. In some embodiments, the low-power focus position is selected based on a type of actuator. In some embodiments, the method uses actuator control information stored in the memory circuit, which is used by the processor to control the actuator to move the lens to the low-power focus position. In some embodiments, the memory circuit comprises two or more memory components.

IMPLEMENTING SYSTEMS AND TERMINOLOGY

Implementations disclosed herein provide systems, methods and apparatus for compact stereoscopic imaging systems. One skilled in the art will recognize that these embodiments may be implemented in hardware, software, firmware, or any combination thereof.

In some embodiments, the circuits, processes, and systems discussed above may be utilized in a wireless communication device. The wireless communication device may be a kind of electronic device used to wirelessly communicate with other electronic devices. Examples of wireless communication devices include cellular telephones, smart phones, Personal Digital Assistants (PDAs), e-readers, gaming systems, music players, netbooks, wireless modems, laptop computers, tablet devices, etc.

The wireless communication device may include one or more image sensors, one or more image signal processors, a memory including instructions or modules for carrying out the processes discussed above. The device may also have data, a processor loading instructions and/or data from memory, one or more communication interfaces, one or more input devices, one or more output devices such as a display device and a power source/interface. The wireless communication device may additionally include a transmitter and a receiver. The transmitter and receiver may be jointly referred to as a transceiver. The transceiver may be coupled to one or more antennas for transmitting and/or receiving wireless signals.

The wireless communication device may wirelessly connect to another electronic device (e.g., base station). Examples of wireless communication devices include laptop or desktop computers, cellular phones, smart phones, wireless modems, e-readers, tablet devices, gaming systems, etc. Wireless communication devices may operate in accordance with one or more industry standards such as the 3rd Generation Partnership Project (3GPP). Thus, the general term "wireless communication device" may include wireless communication devices described with varying nomenclatures according to industry standards.

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

As used herein, the term "plurality" denotes two or more. For example, a plurality of components indicates two or more components. The terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "coupled" may include communicatively coupled, electrically coupled, magnetically coupled, physically coupled, optically coupled, and combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like. The phrase "based on" does not mean "based only on," unless expressly specified otherwise. In other words, the phrase "based on" describes both "based only on" and "based at least on."

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A device, comprising:
a memory; and
a processor coupled to the memory and configured to:
determine that a camera system is in an inactive state while receiving power from a power supply, wherein the camera system includes a lens at a first focus position of a plurality of focus positions;
determine, for the lens, a second focus position of the plurality of focus positions, wherein the camera system with the lens at the second focus position consumes less power than with the lens at the first focus position; and
generate, based on the camera system being in the inactive state while receiving power from the power supply, a first control signal to cause the camera system to move the lens from the first focus position to the second focus position.

2. The device of claim 1, wherein the processor is further configured to determine that a display is in an active state, wherein generating the first control signal is further based on the display being in the active state.

3. The device of claim 2, further comprising:
the camera system coupled to the processor and configured to capture images during the active state of the camera system; and
the display coupled to the processor and configured to display the images captured by the camera system during the active state of the display, wherein the camera system and the display are configured to receive power from the power supply.

4. The device of claim 3, further comprising:
the power supply coupled to the camera system and the display, wherein the power supply is configured to always provide power to the camera system when providing power to the display.

5. The device of claim 4, wherein the processor is further configured to:
determine that the power supply is to stop providing power to the camera system and the display;
determine, for the lens, a third focus position of the plurality of focus positions; and
generate, based on the power supply to stop providing power to the camera system and the display, a second control signal to cause the camera system to move the lens from the second focus position to the third focus position.

6. The device of claim 1, further comprising:
the camera system coupled to the processor, wherein the camera system is configured to receive the first control signal and includes a plurality of components for operation of the camera system, wherein the plurality of components include:
the lens; and an actuator coupled to the lens, wherein the actuator is configured to move the lens from the first focus position to the second focus position based on the first control signal.

7. The device of claim 6, wherein:
the memory is configured to store information corresponding to the second focus position; and
the processor is further configured to retrieve the information corresponding to the second focus position in determining the second focus position.

8. The device of claim 7, wherein:
the memory is further configured to store information corresponding to a third focus position, wherein:
the information corresponding to the second focus position corresponds to a first combination of component types of the camera system; and
the information corresponding to the third focus position corresponds to a second combination of component types of the camera system; and
the processor is configured to retrieve the information corresponding to the second focus position further based on the plurality of components of the camera system corresponding to the first combination of component types of the camera system.

9. The device of claim 1, wherein the second focus position of the lens corresponds to a minimum power consumption of the camera system of a plurality of power consumptions of the camera system with the lens at focus positions different than the second focus position.

10. The device of claim 1, wherein the second focus position is between the first focus position and a third focus position of the plurality of focus positions.

11. A method, comprising:
determining, by a processor, that a camera system is in an inactive state while receiving power from a power supply, wherein the camera system includes a lens at a first focus position of a plurality of focus positions;
determining for the lens, by the processor, a second focus position of the plurality of focus positions, wherein the camera system with the lens at the second focus position consumes less power than with the lens at the first focus position; and
generating, based on the camera system being in the inactive state while receiving power from the power supply, a first control signal to cause the camera system to move the lens from the first focus position to the second focus position.

12. The method of claim 11, further comprising determining that a display is in an active state, wherein generating the first control signal is further based on the display being in the active state.

13. The method of claim 12, further comprising:
supplying power, by the power supply, to the camera system and the display, wherein the power supply is configured to always provide power to the camera system when providing power to the display.

14. The method of claim 13, further comprising:
determining, by the processor, that the power supply is to stop providing power to the camera system and the display;
determining for the lens, by the processor, a third focus position of the plurality of focus positions; and
generating, based on the power supply to stop providing power to the camera system and the display, a second control signal to cause the camera system to move the lens from the second focus position to the third focus position.

15. The method of claim 11, further comprising:
receiving, by the camera system, the first control signal; and
adjusting, by the camera system, the lens from the first focus position to the second focus position based on the first control signal.

16. The method of claim 15, further comprising:
storing, by a memory, information corresponding to the second focus position; and
retrieving, by the processor, the information corresponding to the second focus position in determining the second focus position.

17. The method of claim 16, further comprising:
storing, by the memory, information corresponding to a third focus position, wherein:
the information corresponding to the second focus position corresponds to a first combination of component types of the camera system; and
the information corresponding to the third focus position corresponds to a second combination of component types of the camera system;
wherein retrieving, by the processor, the information corresponding to the second focus position is further based on the camera system including the first combination of component types of the camera system.

18. The method of claim 11, wherein the second focus position of the lens corresponds to a minimum power consumption of the camera system of a plurality of power consumptions of the camera system with the lens at focus positions different than the second focus position.

19. The method of claim 11, wherein the second focus position is between the first focus position and a third focus position of the plurality of focus positions.

20. A non-transitory computer readable medium storing instructions that, when executed by a processor of a device, cause the device to:
determine that a camera system is in an inactive state while receiving power from a power supply, wherein the camera system includes a lens at a first focus position of a plurality of focus positions;
determine, for the lens, a second focus position of the plurality of focus positions, wherein the camera system with the lens at the second focus position consumes less power than with the lens at the first focus position; and
generate, based on the camera system being in the inactive state while receiving power from the power supply, a first control signal to cause the camera system to move the lens from the first focus position to the second focus position.

21. The computer readable medium of claim 20, wherein the instructions further cause the device to determine that a display is in an active state, wherein generating the first control signal is further based on the display being in the active state.

22. The computer readable medium of claim 21, wherein the instructions further cause the device to:
determine that the power supply is to stop providing power to the camera system and the display, wherein the power supply always supplies power to the camera system when supplying power to the display;
determine, for the lens, a third focus position of the plurality of focus positions; and
generate, based on the power supply to stop providing power to the camera system and the display, a second control signal to cause the camera system to move the lens from the second focus position to the third focus position.

23. The computer readable medium of claim 20, wherein the instructions further cause the device to retrieve, from a memory, a first information corresponding to the second focus position in determining the second focus position.

24. The computer readable medium of claim 23, wherein the instructions further cause the device to select the first information from a plurality of information including a second information corresponding to a third focus position, wherein:
- the information corresponding to the second focus position corresponds to a first combination of component types of the camera system;
- the information corresponding to the third focus position corresponds to a second combination of component types of the camera system; and
- the selection is based on the camera system including the first combination of component types of the camera system.

25. The computer readable medium of claim 20, wherein the second focus position of the lens corresponds to a minimum power consumption of the camera system of a plurality of power consumptions of the camera system with the lens at focus positions different than the second focus position.

26. The computer readable medium of claim 20, wherein the second focus position is between the first focus position and a third focus position of the plurality of focus positions.

27. A device, comprising:
- means for determining that a camera system is in an inactive state while receiving power from a power supply, wherein the camera system includes a lens at a first focus position of a plurality of focus positions;
- means for determining, for the lens, a second focus position of the plurality of focus positions, wherein the camera system with the lens at the second focus position consumes less power than with the lens at the first focus position; and
- means for generating, based on the camera system being in the inactive state while receiving power from the power supply, a first control signal to cause the camera system to move the lens from the first focus position to the second focus position.

28. The device of claim 27, further comprising means for determining that a display is in an active state, wherein generating the first control signal is further based on the display being in the active state.

29. The device of claim 28, further comprising:
- means for always providing power to the camera system when providing power to the display.

30. The device of claim 29, further comprising:
- means for determining that the power supply is to stop providing power to the camera system and the display;
- means for determining, for the lens, a third focus position of the plurality of focus positions; and
- means for generating, based on the power supply to stop providing power to the camera system and the display, a second control signal to cause the camera system to move the lens from the second focus position to the third focus position.

* * * * *